(12) United States Patent
Fruehauf

(10) Patent No.: US 8,604,416 B2
(45) Date of Patent: Dec. 10, 2013

(54) METHOD OF FORMING A SCINTILLATOR DEVICE

(75) Inventor: Diane L. Fruehauf, Streetsboro, OH (US)

(73) Assignee: Saint-Gobain Ceramics & Plastics, Inc., Worcester, MA (US)

(*) Notice: Subject to any disclaimer, the term of this patent is extended or adjusted under 35 U.S.C. 154(b) by 549 days.

(21) Appl. No.: 12/563,019

(22) Filed: Sep. 18, 2009

(65) Prior Publication Data

US 2010/0072398 A1   Mar. 25, 2010

Related U.S. Application Data

(60) Provisional application No. 61/098,385, filed on Sep. 19, 2008.

(51) Int. Cl.
*G01V 5/04* (2006.01)

(52) U.S. Cl.
USPC ........................................... 250/261

(58) Field of Classification Search
USPC .................... 250/256, 261, 269.1, 361 R
See application file for complete search history.

(56) References Cited

U.S. PATENT DOCUMENTS

| | | | |
|---|---|---|---|
| 4,004,151 A | 1/1977 | Novak | |
| 4,158,773 A | 6/1979 | Novak | |
| 4,383,175 A | 5/1983 | Toepke | |
| 4,649,276 A * | 3/1987 | Suzuki | 250/370.11 |
| 4,764,677 A | 8/1988 | Spurney | |
| 4,876,450 A * | 10/1989 | Montgomery | 250/261 |
| 4,994,673 A | 2/1991 | Perna et al. | |
| 5,280,890 A | 1/1994 | Wydra | |
| 5,651,535 A | 7/1997 | David | |
| 5,796,109 A * | 8/1998 | Frederick et al. | 250/368 |
| 6,355,932 B1 | 3/2002 | Frederick | |
| 6,433,340 B1 * | 8/2002 | Penn | 250/361 R |
| 6,839,362 B2 | 1/2005 | Kokta et al. | |
| 6,844,084 B2 | 1/2005 | Kokta et al. | |
| 6,877,901 B2 | 4/2005 | Wollenweber | |
| 2003/0199603 A1 * | 10/2003 | Walker et al. | 522/99 |
| 2004/0119008 A1 * | 6/2004 | Williams et al. | 250/256 |
| 2005/0154079 A1 * | 7/2005 | Walker et al. | 522/99 |
| 2005/0184241 A1 | 8/2005 | Clarke et al. | |
| 2006/0091312 A1 * | 5/2006 | Saenger | 250/361 R |
| 2007/0145260 A1 * | 6/2007 | Frederick et al. | 250/269.3 |
| 2009/0283688 A1 * | 11/2009 | Fruehauf et al. | 250/370.11 |

FOREIGN PATENT DOCUMENTS

| | | |
|---|---|---|
| CN | 1653357 A | 8/2005 |
| WO | 03/083512 A2 | 10/2003 |

* cited by examiner

*Primary Examiner* — Casey Bryant
(74) *Attorney, Agent, or Firm* — Abel Law Group, LLP; Robert N. Young

(57) ABSTRACT

A method of forming a scintillator device includes inserting a window into a lumen of a window support ring. The window support ring has an annular structure defining the lumen. The lumen extends between first and second ends of the window support ring. The method also includes inserting a scintillator material into a cavity of a housing defined by an annular sidewall of the housing. The housing has an anterior end and a posterior end. The sidewall defines an opening at the anterior end of the housing. The scintillator material is inserted into the cavity via the opening. The method further includes adhering the window to a front face of the scintillator material and coupling the first end of the window support ring to the annular sidewall of the housing at the anterior end to close the opening.

20 Claims, 3 Drawing Sheets

METHOD OF FORMING A SCINTILLATOR DEVICE

CROSS-REFERENCE TO RELATED APPLICATION(S)

The present application claims priority from U.S. Provisional Patent Application No. 61/098,385, filed Sep. 19, 2008, entitled "METHOD OF FORMING A SCINTILLATOR DEVICE," naming inventor Diane Fruehauf, which application is incorporated by reference herein in its entirety.

FIELD OF THE DISCLOSURE

This disclosure in general relates to methods of forming scintillator devices and in particular, to ruggedized scintillator devices for industrial applications.

BACKGROUND

Scintillation detectors have been employed in various industrial applications, such as the oil and gas industry for well logging. Typically, these detectors have scintillator materials made of an activated sodium iodide material that is effective for detecting gamma rays. Generally, the scintillator materials are enclosed in tubes or casings, which include a window permitting radiation induced scintillation light to pass out of the crystal package for measurement by a light-sensing device, such as a photomultiplier tube. The photomultiplier tube converts the light photons emitted from the crystal into electrical pulses that are shaped and digitized by associated electronics and that can be registered as counts and transmitted to analyzing equipment.

In terms of well logging applications, the ability to detect gamma rays makes it possible to analyze rock strata as gamma rays are emitted from naturally occurring radioisotopes, typically of shales that surround hydrocarbon reservoirs. Today, a common practice is to make measurements while drilling (MWD). For MWD applications, the detector should be ruggedized, that is, it should have a high shock resistance and be capable of withstanding high temperatures, while maintaining performance specifications for a reasonable lifetime.

A problem associated with MWD applications is that the detector reports a higher than actual count rate when the scintillation device detects false counts resulting from vibration. Falsely high readings can occur when the detector output is composed of radiation-induced counts and vibration-induced counts. Moreover, the problem is exaggerated when detecting low-level radiation events while the detector is subject to a severe operational environment, such as drilling.

Accordingly, the industry continues to seek improvements in scintillator devices, particularly ruggedized scintillator devices that can withstand the harsh environments of industrial applications, such as high shock and high temperature applications common in drilling. In addition, it is desirable to provide ruggedized scintillator devices that maintain performance over an extended lifetime.

SUMMARY

In a particular embodiment, a scintillator device includes a window support ring having an annular structure defining a lumen extending between a first end and a second end of the window support ring. In addition, the scintillator device includes a sapphire window disposed within the lumen and includes a housing having an annular wall and an enclosed posterior end. The annular wall and the enclosed posterior end define a cavity. The first end of the window support ring is coupled to the housing at the anterior end. Further, the scintillator device includes a scintillator material disposed within the cavity of the housing. The scintillator material is adhesively coupled to the sapphire window. The scintillator device has a Vibration Rating to at least 30 G(rms) and a Shock Rating to at least 1000 G.

In a further exemplary embodiment, a method of forming a scintillator device includes inserting a window into a lumen of a window support ring. The window support ring has an annular structure defining the lumen. The lumen extends between first and second ends of the window support ring. The method also includes inserting a scintillator material into a cavity of a housing defined by an annular sidewall of the housing. The housing has an anterior end and a posterior end. The sidewall defines an opening at the anterior end of the housing. The scintillator material is inserted into the cavity via the opening. The method further includes adhering the window to a front face of the scintillator material, and coupling the first end of the window support ring to the annular sidewall of the housing at the anterior end to close the opening.

In another exemplary embodiment, a method of forming a scintillator device includes providing a housing having an annular sidewall defining an interior cavity. The housing has an anterior and a posterior end. The posterior end is enclosed. The sidewall at the anterior end defines an opening. The method further includes inserting a window into a lumen of a window support ring. The window support ring has an annular structure defining the lumen. The lumen extends between the first and second ends of the window support ring. The method further includes inserting a scintillator material into the interior cavity of the housing via the opening, adhering the window to a front face of the scintillator material, and coupling the first end of the window support ring to the annular sidewall of the housing at the anterior end to close the opening.

In a further exemplary embodiment, a method of forming a scintillator device includes providing a housing having an annular sidewall defining an interior cavity. The housing has an anterior end and a posterior end. The posterior end is enclosed. The annular sidewall at the anterior end defines an opening. The method also includes inserting a sapphire window into a lumen of a window support ring. The window support ring has an annular structure defining the lumen. The lumen extends between first and second ends of the window support ring. The method further includes inserting a biasing member into the interior cavity of the housing via the opening and inserting a scintillator material into the interior cavity of the housing via the opening. The scintillator material has a front face, a rear face, and a side face. A reflective material is disposed on the rear face and side face of the scintillator material. The front face of the scintillator material is disposed proximal to the opening. The method also includes adhering the sapphire window to the front face of the scintillator material, coupling the first end of the window support ring to the annular sidewall of the housing at the anterior end to close the opening, coupling an optical wave guide to the second end of the annular structure of the window support ring, and coupling a photodetector to the optical waveguide.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE DRAWINGS

In a particular embodiment, a scintillator component of a radiation detector is formed by loading the scintillator components into a housing from an anterior end in contrast to loading components from a posterior end. Proximal to the anterior end is a window through which photons generated by a scintillator material pass to a photon detector. In an example, a scintillator material is loaded into a housing from the anterior end, a window assembly is adhered to a front face of the scintillator material, and the window assembly is coupled to the housing. In addition, other components, such as biasing members, reflective members, potting materials, other resilient materials, or a combination thereof, can be loaded into the housing via the anterior end prior to coupling the window assembly.

In an exemplary embodiment, the scintillator device includes a window assembly coupled to an anterior end of a housing. The housing defines an internal cavity in which a scintillator material is disposed. The window assembly includes a window, such as a sapphire window, and a support ring, such as a titanium support ring. The scintillator material is bonded to the sapphire window with an adhesive. In particular, the scintillator device can have a Vibration Rating of at least 30 G(rms) and a Shock Rating of at least 1000 G(peak), as defined below.

Figure 1:
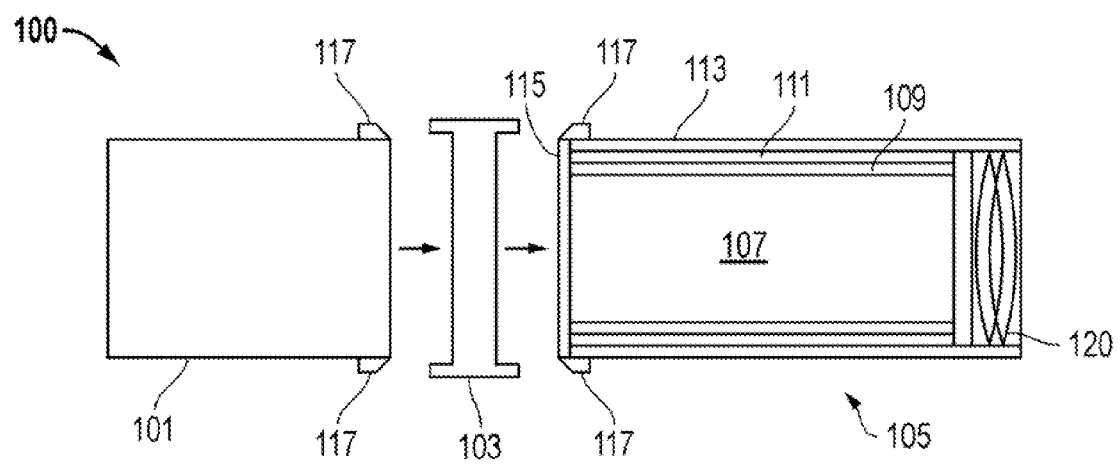
FIG. 1 includes an illustration of an exemplary radiation detector.

Referring to the figures, FIG. 1 illustrates a radiation detector 100 according to one embodiment. As illustrated, the radiation detector 100 includes a photosensor 101, light pipe 103, and a scintillator component 105. As mentioned above, the scintillator component 105 can include a scintillator material 107 disposed within and substantially surrounded by a reflector 109 and a shock absorbing member 111. The scintillator material 107, the reflector 109, and the shock absorbing member 111 are housed within a casing 113. A window 115 is at one end of the casing 113. Optionally, a biasing member 120 biases the scintillator material 107 toward the window 115.

In further reference to FIG. 1, the photosensor 101 can be a device capable of spectral detection and resolution, such as a photomultiplier tube or other detection device. The photons emitted by the scintillator material 107 are transmitted through the window 115 of the scintillator housing 105, through the light pipe 103, to the photosensor 101. The photosensor 101 provides a count of the photons detected, which provides data relating to the radiation detected by the scintillator material. The photosensor 101 can be housed within a tube or housing made of a material capable of withstanding and protecting the electronics of the photosensor 101, such as a metal, metal alloy or the like. Various materials can be provided within the photosensor 101, such as within the detection device housing, to stabilize the detection device during use and ensure good optical coupling with the light pipe 103 and the scintillator housing 105.

As illustrated, the light pipe 103 is disposed between the photosensor 101 and the scintillator housing 105. The light pipe 103 can facilitate optical coupling between the photosensor 101 and the scintillator material 107. According to one embodiment, the light pipe 103 can be coupled to the scintillator housing 105 and the photosensor 101 using biasing members 117 that provide a spring resiliency. Such biasing members 117 can facilitate absorption of shocks to the detector 100 which can reduce false readings and counts during use of the device. Alternatively, the biasing members 117 can be used in conjunction with other known coupling methods, such as the use of an optical gel or bonding agent.

Figure 2:
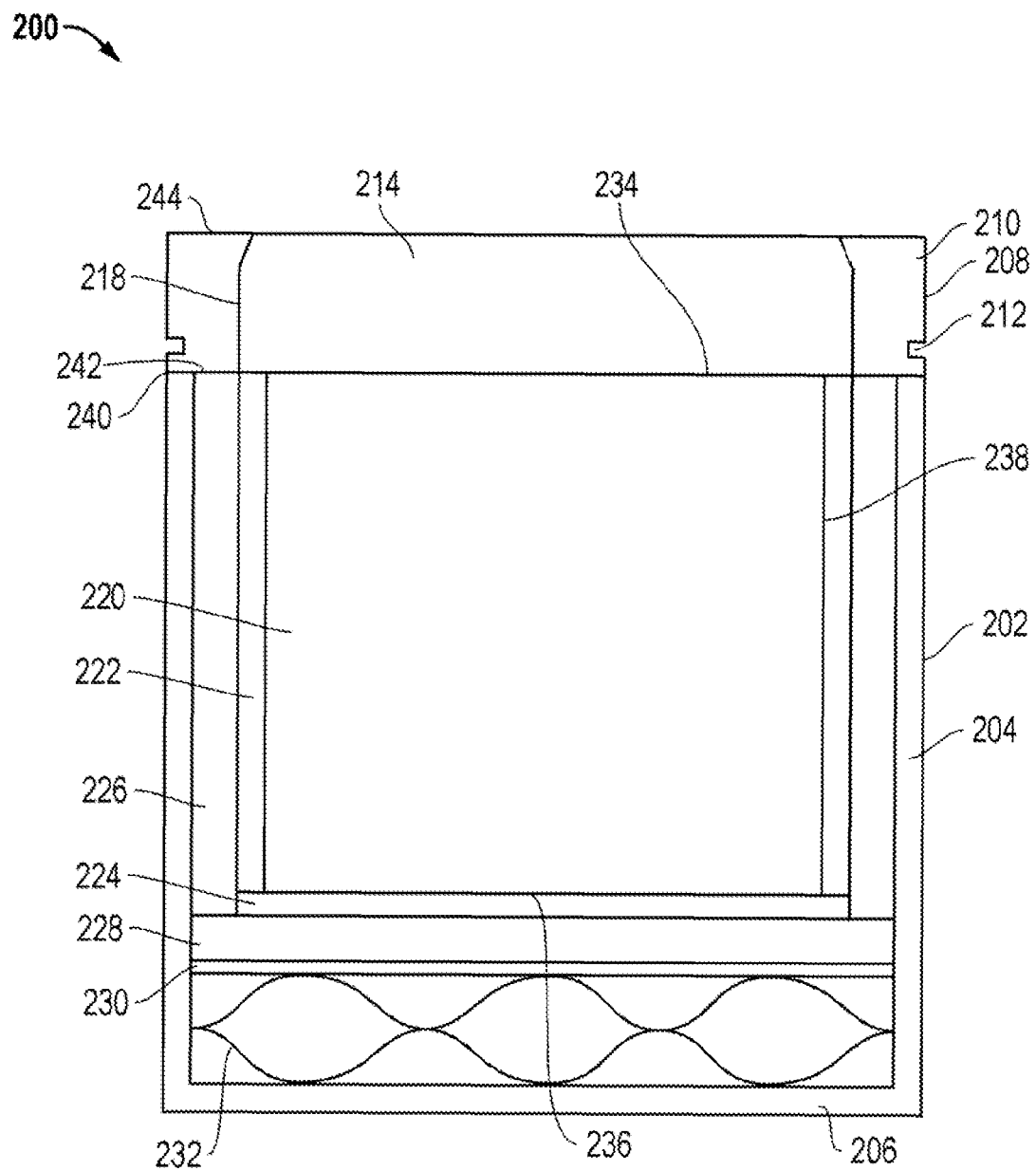
FIG. 2 includes an illustration of an exemplary scintillator device.

In an embodiment, FIG. 2 includes an illustration of an exemplary scintillator component 200, which includes a housing 202 coupled to a window support ring 208. Within the housing 202, a scintillator material 220 has a front face 234 aligned with a window 214. In practice, the scintillator material 220 as a result of excitation produces photons that pass through the front face 234 of the scintillator material 220 and through the window 214 into an optical waveguide and photon detector.

The housing 202 can include a sidewall 204 and a posterior wall 206. In particular, the housing 202 can be formed of a material suitable for the environment that the housing 202 will experience during use. For example, the housing 202 can be formed of a metal, such as a titanium, stainless steel or aluminum. In particular, the housing 202 is formed of titanium. The sidewall 204 and the posterior wall 206 can be formed as a single piece. Alternatively, the posterior wall 206 can be formed as a separate piece that is coupled to the sidewall 204, such as through a threaded coupling, soldering, brazing, welding, or a combination thereof.

In an example, the sidewall 204 has a cross-sectional shape such as a circle or a polygon, for example, a triangle, a rectangle, a hexagon, an octagon, or an irregular polygon, or a combination thereof. In addition, the sidewall 204 is an annular structure surrounding an interior cavity. An annular structure includes structures that have a circular or polygonal cross-section and surround a central axis.

In a further example, the annular sidewall 204 at an anterior end 240 of the housing 202 forms an opening through which components of the scintillator device can be inserted. For example, a biasing member 232 can be inserted into the housing and disposed against the posterior wall 206. As illustrated, the biasing member 232 can be a spring. Alternatively, the biasing member 232 can be an elastomeric material. A back plate 230 can be disposed within the housing 202 adjacent to the biasing member 232. Optionally, a cushioning pad 228 can be disposed over the back plate 230. In addition, the scintillator material 220 can be disposed within the housing over the optional biasing member 232, back plate 230, and cushioning pad 228.

In alternative embodiments, optional components, such as the biasing member 232 (illustrated as a spring), the back plate 230, and the cushioning pad 228, are replaced by a single biasing member, such as an elastomeric component. In a further alternative embodiment, the biasing member 232, the back plate 230, the cushioning pad 228, and a resilient layer 226 are each replaced by an elastomeric material.

In a further example, the scintillator material 220 is located within the housing 202. An exemplary scintillator material 220 is formed of a material such as an alkali metal halide which has been activated by the inclusion of thallium, sodium, or rare earths, such as NaI(Tl), KBr(Tl), KI(Tl), and KCl(Tl); CsI(Tl) and CsI(Na); and LiI(Eu); BGO; $LaCl_3(Ce)$; $LaBr_3(Ce)$; $CeBr_3$; or a plastic scintillator, such as Polyvinyl Toluene. In a particular example, the scintillator material 220 includes a lanthanum halide material, such as $LaCl_3(Ce)$ or $LaBr_3(Ce)$, or any combination thereof. In an example, the scintillator material 220 is formed of a single crystal scintillator material. Alternatively, the scintillator material 220 can be an extruded scintillator material.

The scintillator material 220 can have a front face 234 and a rear face 236. In addition, the scintillator material 220 can include a side face 238. As illustrated, the rear face 236 and side face 238 are in contact with a reflective material. For example, the rear face 236 can be in contact with a reflective material 224 and the side face 238 can be in contact with a reflective material 222. In an example, the reflective materials 222 or 224 are formed of a porous polytetrafluoroethylene (PTFE), reflective metal oxide crystals, a reflective foil, or any combination thereof. The reflective materials 222 or 224 can be formed as a single layer. Alternatively, the reflective materials 222 or 224 can be formed of one or more layers of different materials.

In an additional example, a resilient layer 226 is positioned between the annular sidewall 204 of the housing 202 and the scintillator material 220. In an example, the resilient layer 226 can include a resilient material, such as a polymeric elastomer, for example, a silicone elastomer. In another example, the resilient layer 226 includes mechanical components configured to provide a centering bias on the scintillator material 220. In a further example, the resilient layer 226 is formed of a set of components providing a compressive force on the scintillator material when inserted within the housing 202.

In a further example, the housing 202 at the anterior end 240 is coupled with a window support ring 208. The window support ring 208 can be formed of titanium, stainless steel, or aluminum. In particular, the window support ring 208 is formed of titanium. The window support ring 208 can include an annular structure 210 defining an interior wall 218 that defines a lumen in which a window 214 is disposed. The lumen extends between a first end 242 of window support ring 208 in contact with the anterior end 240 of the housing 202 to a second end 244 configured for coupling with optical components of the radiation detector. The first end 242 of the window support ring 208 is coupled to the anterior end 240 of the housing 202. For example, the first end 242 of the window support ring 208 can be coupled to the housing 202 using a soldered connection. In another example, the first end 242 of the window support ring 208 can be coupled to the housing 202 using a brazed connection. In a further example, the first end 242 of the window support ring 208 can be coupled to the housing 202 using a welded connection. In an additional example, the window support ring 208 includes a channel 212 extending radially inwardly from an exterior surface of the window support ring 208. The channel 212 can limit the amount of heat passing to the remainder of the window support ring 208 and the window 214 during coupling through brazing, soldering, or welding. Further, a channel (not shown) can extend within the window support ring 208 from the first end 242 in parallel with an axis of the window support ring 208.

In an exemplary embodiment, the window 214 is coupled with the annular structure 210 through soldering or brazing.

In a particular example, the window 214 is adhered to the scintillator material 220. For example, the window 214 can be formed of a sapphire material. In a particular example, the window has a thickness in a range of 20 mil to 300 mil, such as 20 mil to 200 mil, or even 50 mil to 150 mil. The window 214 can be coupled with the front face 234 of the scintillator material 220 using an adhesive. For example, an adhesive having transparency and exhibiting low off-gassing at operating temperatures as high as 200° C. can be used to adhere the front face 234 of the scintillator material 220 to the window 214. An exemplary adhesive includes an epoxy or a silicone adhesive, for example, having a transparency in the UV range of greater than 80%. The thickness of the adhesive is in a range of 5 mil to 30 mil, such as 10 mil to 30 mil, or even 10 mil to 20 mil. Alternatively, an optical pad can be positioned between the front face 234 of the scintillator material 220 and the first end of the window 214. The optical pad can have a thickness in a range of 10 mil to 125 mil.

In a particular embodiment, the radiation detector can be a ruggedized detector. A ruggedized detector is rated for high temperature environments and high vibration and shock conditions. In a particular example, a ruggedized detector is rated for use at temperatures to at least 150° C., such as at least 175° C., at least 185° C., at least 190° C., at least 200° C., or even as high as 210° C. or higher. The term "temperature rating" indicates that a tested device can withstand the stated temperature without significant deterioration over a period of 2 hours. Further, the ruggedized detector can be rated for shock (Shock Rating) to at least 100 G at 1 ms, such as at least 800 G, such as at least 900 G or even greater than 1000 G, when tested in accordance with Mil-STD-810E Method 516.4 using a pneumatic shock machine available from Avex. The term "shock rating" indicates that a tested device can withstand the stated shock when tested in accordance with the above method. In particular, the Shock Rating is at least 1010 G, such as at least 1050 G, at least 1100 G, or even at least 1500 G. The ruggedized detector can also be rated for random vibration (Vibration Rating) to at least 5 G(rms) at 30-1000 Hz, such as at least 15 G(rms), or even as high as 20 G(rms) or higher, and periodic vibration to at least 20 G(peak) at 30-1000 Hz, such as 30 G(peak), when measured in accordance with Mil-STD-810E Method 514.4 using an electrodynamic shaker available from Unholtz-Dickie or LDS. The term "vibration rating" indicates that a tested device can withstand the stated vibration when tested in accordance with the above method. In particular, the Vibration Rating can be at least 30 G(peak), at least 34 G(peak), at least 38 G(peak), or even at least 40 G(peak).

Such an exemplary device can be formed by front-loading the housing or loading the housing via the anterior opening. As illustrated in the flow diagram of FIG. 3, a method 300 includes providing a housing, as illustrated at 302. The housing, for example, includes an annular sidewall and an enclosed posterior wall. The annular sidewall defines an opening at an anterior end of the housing. Further, the annular sidewall and the posterior wall define a cavity interior to the housing.

A biasing member can be inserted into the housing, as illustrated at 304. For example, a biasing member such as a spring can be inserted into the housing along with an optional back plate and cushioning pad. Alternatively, a single elastomeric component can be inserted into the housing prior to inserting the scintillator material. In a particular example, the scintillator material can be inserted absent a biasing member.

As illustrated at 306, a scintillator material can be inserted into the housing. In an example, a scintillator assembly including the scintillator material, a reflective layer surrounding the side face and rear face of the scintillator material, and resilient materials or components surrounding the scintillator material are inserted into the housing. For example, the scintillator material can be wrapped or coated with a reflective material. In addition, the sidewall can be encased in a polymeric material sufficient to occupy the space between the scintillator material and a sidewall of the housing. In an example, the polymeric material is compressed during insertion. Alternatively, the scintillator material can be inserted into the housing and a reflective powder packed around the scintillator material. In a further alternative embodiment, a scintillator material surrounded on its side face and rear face by a reflective material is inserted into the housing, and the housing is filled with a polymeric material, such as a low off gassing silicone elastomer. In particular, a front face of the scintillator material is free of reflective material and is disposed proximal to the anterior opening of the housing.

Figure 4:
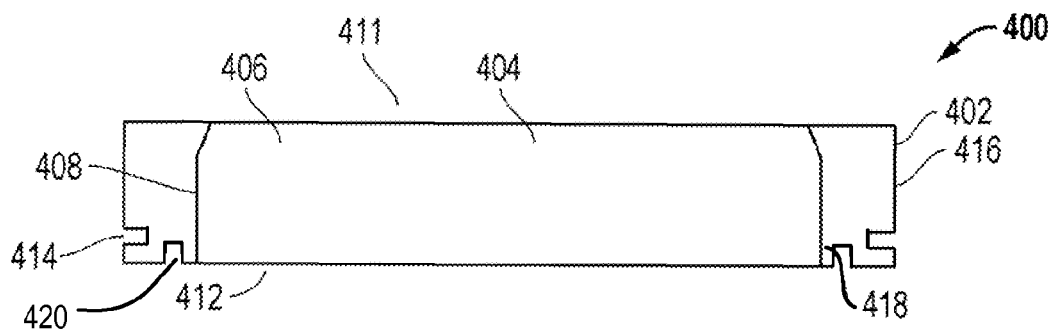
FIG. 4 includes an illustration of an exemplary window assembly.

In a further example, a window disposed in a window support ring is adhered to the scintillator material's front face, as illustrated at 308. In particular, a window assembly 400, as illustrated in FIG. 4, includes a window 404 surrounded by a window support ring 402. The window 404 is, for example, formed of a sapphire material. The window support ring 402 includes an outer surface 416 and an inner surface 408. The inner surface 408 defines a lumen 406 extending from a first end 412 to a second end 411 of the window assembly 400. The lumen 406 can have a shape having a circular or polygonal cross-section that surrounds a central axis.

In a particular example, the window 404 can be secured to the window support ring 402 using solder or brazing. Alternatively, other mechanical or bonding methods can be used to secure the window 404.

At the first end 412 of the window assembly 400, the window support ring 402 is coupled with the housing of the scintillator device. In an example, the annular support ring 402 includes a channel 414 extending from the outer wall 416 radially inwardly. As a result, the channel 414 can define a portion 418 of the window support ring 402 having a smaller cross section, which limits the flow of heat away from the first end 412 of the window support ring 402 when a window support ring 402 is being attached to the housing by a method such as soldering, welding, or brazing. In another example, a channel 420 extends from the first end 412 into the window assembly 400 parallel to an axis of the window assembly 400. The channel 420 can limit the flow of heat toward the window 404.

Returning to FIG. 3, the window can be adhered to the scintillator material using a transparent adhesive. Preferably, the transparent adhesive provides a hard permanent interface between the window and the scintillator material and does not off-gas at operating temperatures of the scintillator device. For example, the adhesive can be an epoxy or silicone adhesive.

Figure 3:
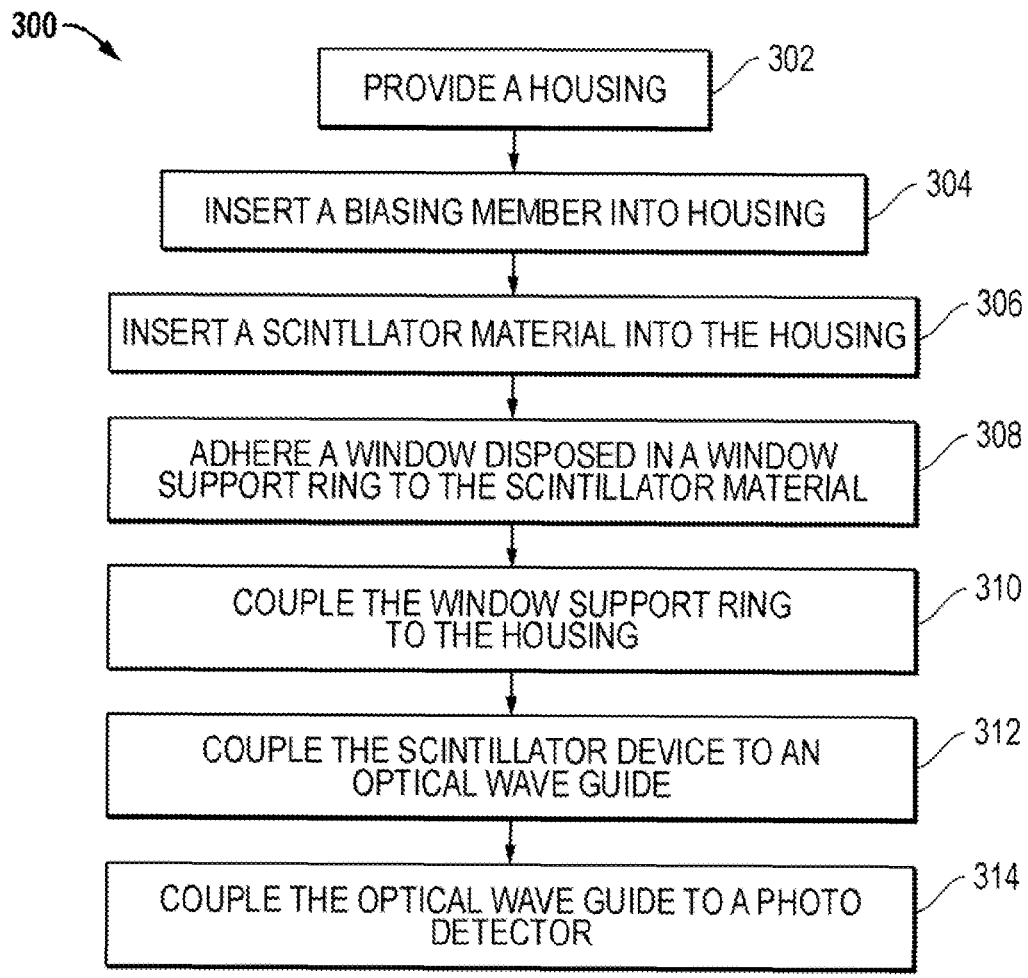
FIG. 3 includes a flow diagram of an exemplary method for forming a radiation detector.

While the method 300 illustrated in FIG. 3 depicts inserting the scintillator material into the housing prior to adhering the window to the scintillator material, the scintillator material can alternatively be adhered to the window prior to inserting the scintillator material into the housing. For example, the scintillator material can be adhered to the window using an adhesive. Subsequently, the scintillator material can be inserted into the housing and a potting material or packing material can be inserted around the housing prior to coupling the window support ring to the housing.

As illustrated at 310, the window support ring can be coupled to the housing. For example, the window support ring can be welded to the housing. Alternatively, the window support ring can be soldered to the housing a high temperature soldering material. In another alternative, the window support ring can be brazed to the housing a high temperature brazing material.

The resulting scintillator component can be optically coupled to a photodetector. For example, the scintillator component can be coupled to an optical waveguide, as illustrated at 312, and the optical waveguide can be coupled to a photodetector, as illustrated at 314. For example, the scintillator component is coupled to an optical waveguide, which engages the window support ring. Further, a photodetector, such as a photomultiplier tube, is coupled to the optical waveguide.

In particular, loading of a scintillator component via an anterior end of the housing provides several advantages. Traditional methods have resulted in devices that produce a high number of vibrationally induced counts. To solve this problem, traditional methods have turned to increasing the bias on the scintillator material both radially inward and axially towards the window. However, this increase in biasing tends to stress the scintillator material, ultimately leading to cracks that reduce device life. In contrast, the current method provides for a device having low vibrationally induced counts and low photon loss between the crystal and the photodetector, providing for higher signal to noise ratios and longer effective device life. Further, devices formed by the current method exhibit improved ruggedness and greater intensity and resolution of signal output.

While similar structures have been used in the past, the delicate nature of window materials have lead to designs and manufacturing methods that require posterior loading of components. For example, U.S. Pat. No. 4,383,175 discloses radiation detectors that are not rated for rugged conditions. While U.S. Pat. No. 4,383,175 illustrates similar window support ring structures in combination with soda-lime glass windows, the sensitivity of soda lime glass to heat, particularly those temperatures associated with welding, encouraged posterior loading of scintillator components. In addition, such temperature sensitivity leads to adjustments in subsequent scintillator designs that further required posterior loading. In contrast, more recent advances in window materials, such as sapphire, permit the use of titanium support rings and permit front end loading of ruggedized scintillator components, which allows the realization of other design options not previously available to ruggedized scintillator components as a result of posterior loading. Such other design options lead to improved device sensitivity to radiation, decrease vibrationally induced counts, or improve signal-to-noise ratio. When used in a ruggedized device, particularly when the ruggedized device is formed through front end loading techniques, the devices can advantageously have increased window diameter, decreased window thickness, increased light output and increased scintillator crystal length, resulting in improved efficiency.

EXAMPLE

Example 1

A sample window including soda-lime glass and having a thickness of 250 mil and a sample window including sapphire and having a thickness of 80 mil are tested for transmission. Transmission is determined by measuring the pulse height resulting from a 662 keV Cs-137 source. The sapphire window exhibits an increase in pulse height at the Cs-137 photopeak in a range of 25% to 30%. Further improvements are observable in ruggedized devices in which a sapphire window is directly bonded to the scintillator material absent an optical pad relative to ruggedized devices in which a soda-lime glass window is optically coupled to the scintillator material with an optical pad.

Example 2

Sample windows are prepared from sapphire and glass varieties, including crown glass and AFG Krystal Klear by AFG. The sample windows are tested for ultraviolet (UV) and near-UV transmission at wavelengths including 380 nm, 330 nm, and 280 nm. Table 1 illustrates the percent transmission at the specified wavelengths.

TABLE 1

Transmission for Window Materials

| Window Materials | Transmission (%) | | |
|---|---|---|---|
| | 380 nm | 330 nm | 280 nm |
| Sapphire | 84 | 84 | 83 |
| Crown Glass | 87 | 47 | 0 |
| AFG-KK | 83 | 1 | 0 |

As illustrated in Table 1, the sapphire window exhibits greater transmission in the UV spectra. Such transmission is advantageous when using lanthanum halide scintillator material.

Example 3

A sample window including J-glass (a proprietary soda lime glass from Jennette Glass) and having a thickness of 250 mil and a sample window including sapphire and having a thickness of 80 mil are tested for transmission. The sample windows are incorporated into housings including a 1"×1" lanthanum bromide single crystal scintillator material. Transmission is determined by measuring the pulse height resulting from a 662 keV Cs-137 source. The sapphire window exhibits an increase in brightness of approximately 21%. In addition, the sapphire window exhibits a smaller resolution, based on the full width at ½ maximum peak (FWHM). The J-glass sample exhibits a FWHM of 3.64%, and the sapphire sample exhibits a FWHM of 2.88%, or 1.26× lower than the J-glass sample.

Example 4

A sample window including J-glass and having a thickness of 250 mil and a sample window including sapphire and having a thickness of 80 mil are tested for transmission. The sample windows are incorporated into housings including a 1"×4" NaI single crystal scintillator material and are incorporated into housings including a 1"×8" NaI single crystal scintillator material. Transmission is determined by measuring output resulting from exposure to a 662 keV Cs-137 source. Table 2 illustrates change in brightness relative to aspect ratio.

TABLE 2

Change in Brightness and Scintillator Aspect Ratio

| Aspect Ratio | Change in Brightness (%) |
|---|---|
| 1" × 4" | 32 |
| 1" × 8" | 40 |

The sapphire window exhibits an increase in brightness of approximately 32% for the lower aspect ratio crystal and approximately 40% for the higher aspect ratio crystal. As such, the improvement in transmission is greater for higher aspect ratio crystals.

Embodiments of the above-described scintillator device exhibit desirable technical advantages. In particular, the scintillator devices exhibit improved detection and measurement of source radiation, through improved brightness of transmissions from the scintillator and improved resolution. Such improvements are particularly pronounced with high aspect ratio scintillator materials, such as lanthanum halide materials. Further, the scintillator devices exhibit improved ruggedness and are easier to manufacture.

In a first embodiment, a scintillator device includes a window support ring having an annular structure defining a lumen extending between a first end and a second end of the window support ring, a sapphire window disposed within the lumen, and a housing having an annular wall and an enclosed posterior end. The annular wall and the enclosed posterior end define a cavity. The first end of the window support ring is coupled to the housing at the anterior end. The scintillator device also includes a scintillator material disposed within the cavity of the housing and adhesively coupled to the sapphire window. The scintillator device has a Vibration Rating of at least 35 G(rms) and a Shock Rating of at least 1000 G(peak).

In an example of the first embodiment, the scintillator device has a temperature rating to at least 150° C., such as at least 175° C., at least 200° C., or even at least 210° C. The scintillator material can be a single crystal material.

In another example of the first embodiment, a reflector material is disposed between the scintillator material and the annular wall. A biasing member can be disposed between the scintillator material and the enclosed posterior end, the biasing member biasing the scintillator material toward the sapphire window. In an example, the biasing member includes an elastomeric material.

The window support ring can be coupled to the housing with a welded connection. In a further example, the window support ring is coupled to the housing with a brazed connection. In another example, the window support ring is coupled to the housing with a soldered connection.

In a further example of the first embodiment, the window support ring further includes a channel extending radially inwardly from an outer surface of the window support ring. In an additional example, the window support ring further includes a lip extending radially inwardly from an inner surface of the window support ring at the second end, the lip to engage a bevel of the sapphire window.

In a second embodiment, a method of forming a scintillator device includes inserting a window into a lumen of a window support ring. The window support ring has an annular structure defining the lumen. The lumen extends between first and second ends of the window support ring. The method further includes inserting a scintillator material into a cavity of a housing defined by an annular sidewall of the housing. The housing has an anterior end and a posterior end. The annular sidewall defines an opening at the anterior end of the housing. The scintillator material is inserted into the cavity via the opening. The method also includes adhering the window to a front face of the scintillator material and coupling the first end of the window support ring to the annular sidewall of the housing at the anterior end to close the opening.

In an example of the second embodiment, the window includes sapphire. In another example, coupling the window support ring to the annular sidewall of the housing includes brazing the window support ring to the annular sidewall. In a further example, coupling the window support ring to the annular sidewall of the housing includes soldering the window support ring to the annular sidewall. In an additional example, coupling the window support ring to the annular sidewall of the housing includes welding the window support ring to the annular sidewall.

In a further example of the second embodiment, the method further includes inserting a biasing member via the opening into the cavity of the housing prior to inserting the scintillator material. In an additional example, the method further includes inserting a back plate via the opening into the cavity of the housing prior to inserting the scintillator material. In another example, the method further includes inserting a cushioning pad via the opening into the cavity of the housing prior to inserting the scintillator material. In an example, the method further includes coating a side and a rear face of the scintillator material with a reflective material. In a further example, the method further includes inserting into the cavity a polymeric material sufficient to occupy the space between the housing and the scintillator material. In addition, the method can include optically coupling the window to a photodetector.

In an example of the second embodiment, the photodetector includes a photomultiplier tube. In another example, optically coupling the window to the photodetector includes coupling an optical waveguide to the second end of the window support ring and coupling the optical waveguide to the photodetector.

In a third embodiment, a method of forming a scintillator device includes providing a housing having an annular sidewall defining an interior cavity. The housing has an anterior end and a posterior end. The posterior end is enclosed. The sidewall at the anterior end defines an opening. The method further includes inserting a window into a lumen of a window support ring. The window support ring has an annular structure defining the lumen. The lumen extends between first and second ends of the window support ring. The method also includes inserting a scintillator material into the interior cavity of the housing via the opening, adhering the window to a front face of the scintillator material, and coupling the first end of the window support ring to the annular sidewall of the housing at the anterior end to close the opening.

In an example of the third embodiment, the window comprises sapphire. In another example, coupling the window support ring to the annular sidewall of the housing includes brazing the window support ring to the annular sidewall. In an additional example, coupling the window support ring to the annular sidewall of the housing includes soldering the window support ring to the annular sidewall.

In a further example of the third embodiment, the method further includes optically coupling the window to a photodetector. Optically coupling the window to the photodetector can include coupling an optical waveguide to the second end of the window support ring and coupling the optical waveguide to the photodetector.

In a fourth embodiment, a method of forming a scintillator device includes providing a housing having an annular sidewall defining an interior cavity. The housing has an anterior end and a posterior end. The posterior end is enclosed. The annular sidewall at the anterior end defines an opening. The method further includes inserting a sapphire window into a lumen of a window support ring. The window support ring has an annular structure defining the lumen. The lumen extends between first and second ends of the window support ring. The method also includes inserting a biasing member into the interior cavity of the housing via the opening and inserting a scintillator material into the interior cavity of the housing via the opening. The scintillator material has a front face, a rear face, and a side face. A reflective material is disposed on the rear face and side face of the scintillator material. The front face of the scintillator material is disposed proximal to the opening. In addition, the method includes adhering the sapphire window to the front face of the scintillator material, coupling the first end of the annular structure of the window support ring to the annular sidewall of the housing at the anterior end to close the opening, coupling an optical waveguide to the second end of the annular structure of the window support ring, and coupling a photodetector to the optical waveguide.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A scintillator device comprising:
   a window support ring having an annular structure defining a lumen extending between a first end and a second end of the window support ring, the window support ring further including an exterior surface and a channel extending radially inwardly from the exterior surface;
   a sapphire window disposed within the lumen;
   a housing having an annular wall and a posterior wall that encloses a posterior end of the housing, wherein the annular wall and the posterior wall are formed as a single piece, the housing defining a cavity, the first end of the window support ring coupled to the housing at an anterior end of the housing opposite the posterior end; and a scintillator material disposed within the cavity of the housing,
wherein the window support ring is coupled to the end of the housing by a brazed connection, a soldered connection, or a welded connection, wherein the scintillator device has a Vibration Rating of at least 30 G(rms) and a Shock Rating of at least 1000 G(peak), and
wherein the scintillator device is configured such that a photodetector can be optically coupled to the scintillator material via the sapphire window.

2. The scintillator device of claim 1, wherein the scintillator device has a temperature rating to at least 150° C.

3. The scintillator device of claim 1, wherein the scintillator device has a temperature rating to at least 200° C.

4. The scintillator device of claim 1, wherein the scintillator material has an emission peak less than 380 nm.

5. The scintillator device of claim 1, wherein the scintillator material consists essentially of $CeBr_3$ or $LaBr_3(Ce)$, $LaCl_3$(Ce), or any combination thereof.

6. The scintillator device of claim 1, further comprising a reflector material disposed between the scintillator material and the annular wall.

7. The scintillator device of claim 1, further comprising a biasing member disposed between the scintillator material and the posterior end, the biasing member biasing the scintillator material toward the sapphire window.

8. The scintillator device of claim 7, wherein the biasing member includes an elastomeric material.

9. The scintillator device of claim 1, wherein the window support ring further includes a channel extending radially inwardly from an outer surface of the window support ring.

10. The scintillator device of claim 1, wherein the window support ring further includes a lip extending radially inwardly from an inner surface of the window support ring at the second end, the lip to engage a bevel of the sapphire window.

11. The scintillator device of claim 1 wherein the adhesive has a transparency in the UV range of greater than 80%.

12. The scintillator device of claim 1, further comprising an adhesive between and in direct contact with the sapphire window and the scintillator material.

13. The scintillator device of claim 12 wherein the adhesive includes an epoxy, a silicone, or a mixture thereof.

14. The scintillator device of claim 12 wherein the adhesive consists essentially of an epoxy.

15. A method of forming a scintillator device, the method comprising:
inserting a window into a lumen of a window support ring, the window support ring having an annular structure defining the lumen, the lumen extending between first and second ends of the window support ring, the window support ring further including an exterior surface and a channel extending radially inwardly from the exterior surface;
inserting a scintillator material into a cavity of a housing defined by an annular sidewall and a posterior wall that encloses a posterior end of the housing, the annular sidewall and the posterior wall are formed as a single piece, the scintillator material being inserted into the cavity via an anterior opening in the housing opposite the posterior end;
adhering the window to a front face of the scintillator material with an adhesive; and
coupling the first end of the window support ring to the annular sidewall of the housing at the anterior end to close the opening, wherein coupling includes brazing, soldering, or welding,
wherein the scintillator device is configured such that a photodetector can be optically coupled to the scintillator material via the sapphire window.

16. The method of claim 15, wherein the window comprises sapphire.

17. The method of claim 15, further comprising inserting a biasing member via the opening into the cavity of the housing prior to inserting the scintillator material, wherein after inserting the scintillator material, the biasing member is disposed between the posterior wall and the scintillator material.

18. The method of claim 15, further comprising coating a side and a rear face of the scintillator material with a reflective material.

19. A method of forming a scintillator device, the method comprising:
providing a housing having an annular sidewall and a posterior wall that encloses a posterior end of the housing, wherein annular wall and the posterior wall are formed as a single piece, the housing defining an interior cavity, and the annular sidewall at an anterior end defining an opening;
inserting a sapphire window into a lumen of a window support ring, the window support ring having an annular structure defining the lumen, the lumen extending between first and second ends of the window support ring, the window support ring further including an exterior surface and a channel extending radially inwardly from the exterior surface;
inserting a biasing member into the interior cavity of the housing via the opening;
inserting a scintillator material into the interior cavity of the housing via the opening after inserting the biasing member, the scintillator material having a front face, a rear face, and a side face, a reflective material being disposed on the rear face and side face of the scintillator material, the front face of the scintillator material being disposed proximal to the opening;
coupling the first end of the annular structure of the window support ring to the annular sidewall of the housing at the anterior end to close the opening, wherein coupling includes brazing, soldering, or welding;
coupling an optical waveguide to the second end of the annular structure of the window support ring; and
coupling a photodetector to the optical waveguide.

20. The method of claim 19, further comprising adhering the sapphire window to the front face of the scintillator material with an adhesive.

* * * * *

UNITED STATES PATENT AND TRADEMARK OFFICE
CERTIFICATE OF CORRECTION

PATENT NO.       : 8,604,416 B2                                               Page 1 of 1
APPLICATION NO. : 12/563019
DATED            : December 10, 2013
INVENTOR(S)      : Diane L. Fruehauf It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 672 days.

Signed and Sealed this

Twenty-third Day of May, 2017

Michelle K. Lee
*Director of the United States Patent and Trademark Office*